Oct. 10, 1961 R. S. HUNTER ET AL 3,003,388
COLOR DIFFERENCE MEASURING INSTRUMENT
Filed May 9, 1958 4 Sheets-Sheet 1
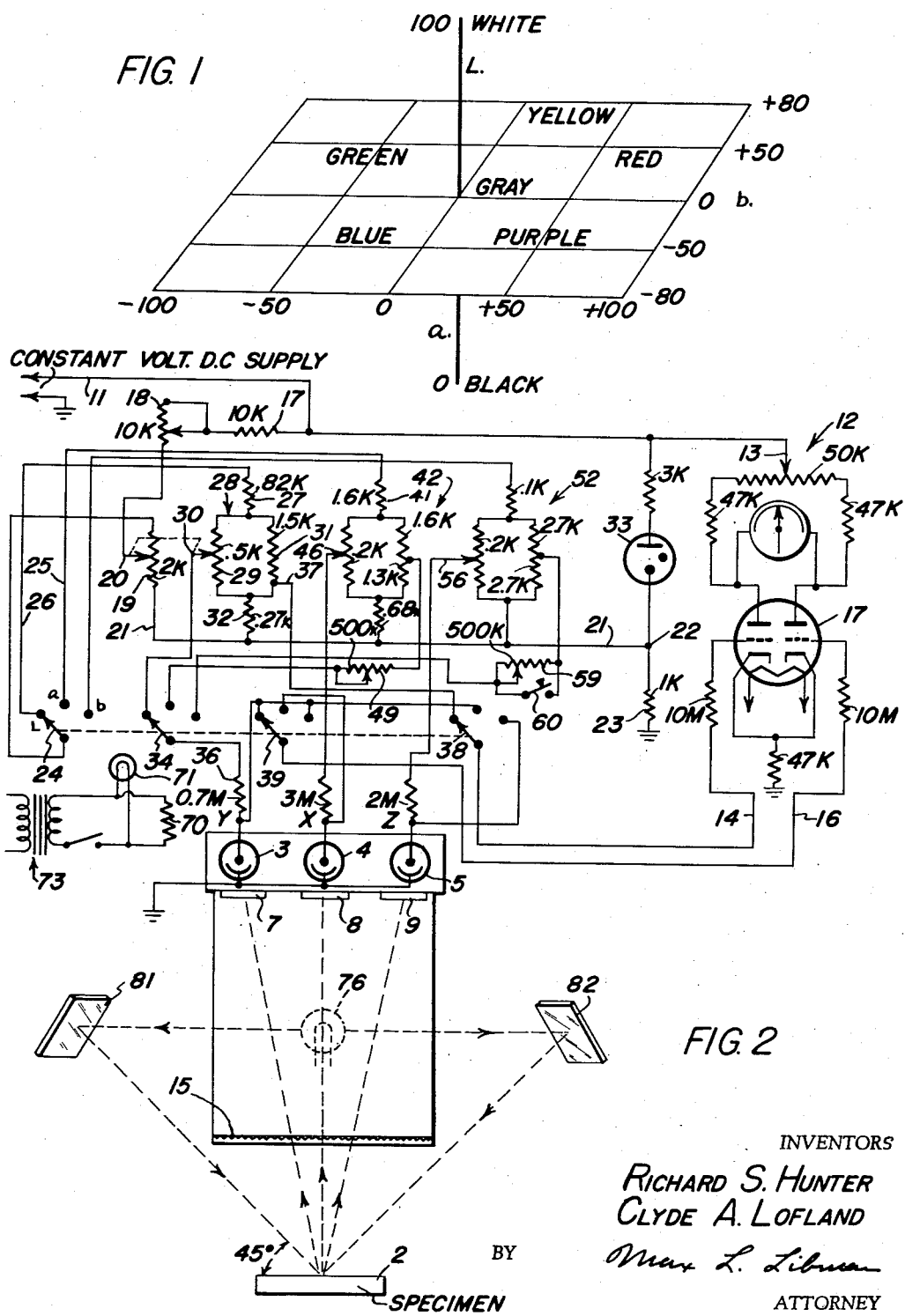
INVENTORS
RICHARD S. HUNTER
CLYDE A. LOFLAND
BY
ATTORNEY

INVENTORS
RICHARD S. HUNTER
CLYDE A. LOFLAND

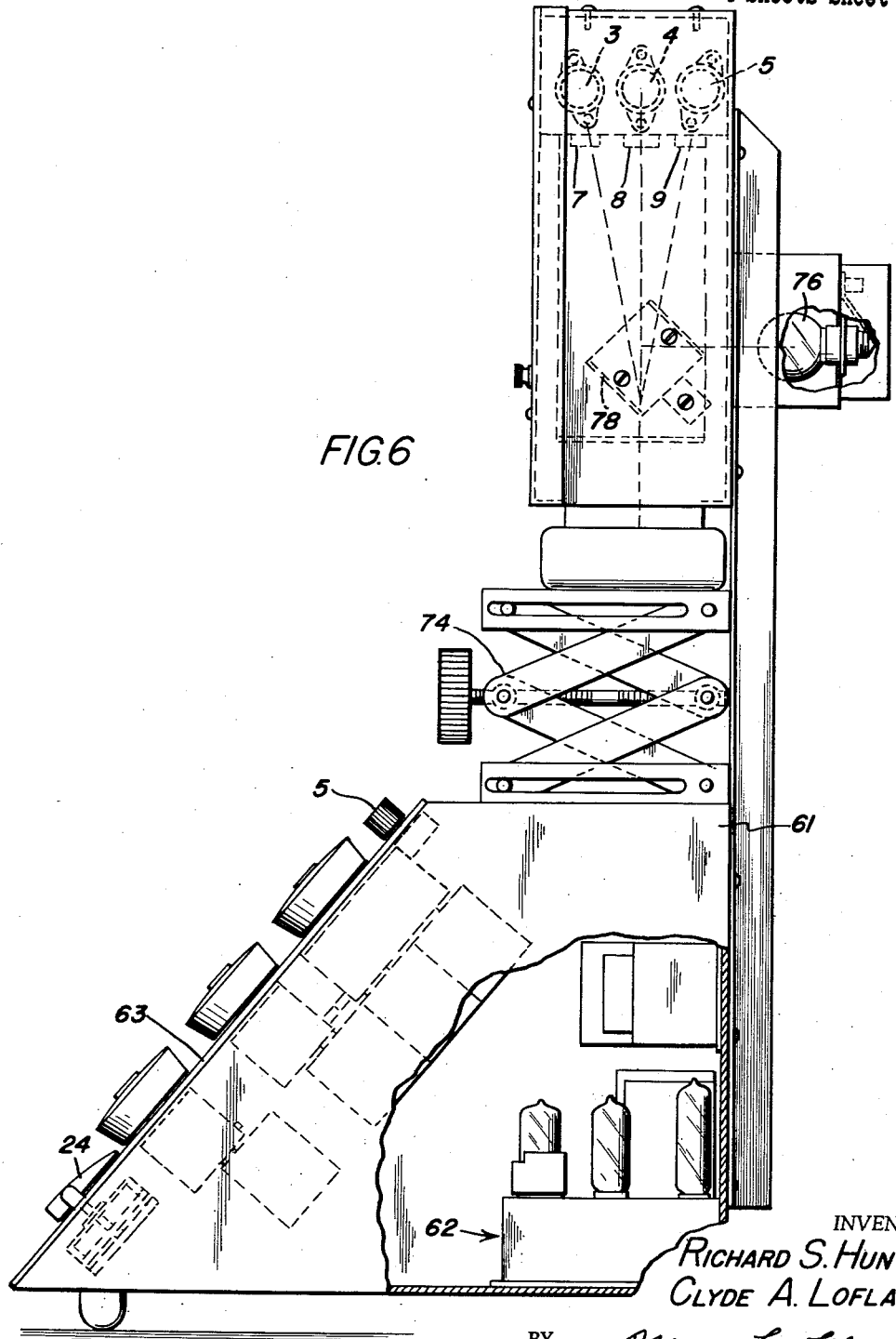

United States Patent Office 3,003,388
Patented Oct. 10, 1961

3,003,388
COLOR DIFFERENCE MEASURING INSTRUMENT
Richard S. Hunter and Clyde A. Lofland, Falls Church, Va., assignors to Hunter Associates Laboratory, Inc., Falls Church, Va., a corporation of Virginia
Filed May 9, 1958, Ser. No. 734,132
10 Claims. (Cl. 88—14)

This invention relates to an instrument for measuring color and color differences of surfaces by photoelectric measurements of light reflected from such surfaces and without reliance on the color judgement of human observers.

Instruments used to measure color are of three types: (1) spectrophotometers, (2) tristimulus filter reflectometers, and (3) trichromatic colorimeters.

A spectrophotometer uses a prism or a grating to isolate wave lengths of the visible spectrum from 380 to 750 millimicrons. It gives curves of reflectance or transmittance as a function of wave length.

A filter reflectometer uses at least three filters instead of the prism or grating used in a spectrophotometer to isolate different wave lengths. It is not possible with filters to isolate the narrow spectral bands available with prisms and gratings. However, with the tristimulus reflectometers widely used for color measurement, narrow spectral bands are not wanted. Instead, filters transmitting rather broad spectral bands corresponding to the spectral response functions of the standardized average observer are used. These instruments give values of reffectance for each of the filters in them.

Colorimeters give, not values of reflectance for specific filters, but numbers corresponding to position in the color solid. There exist a number of visual colorimeters, but these tend to be tedious to use and require skilled operators; therefore they are not popular.

The eye cannot perceive spectrophotometric curves nor identify wave lengths responsible for the sensations of color. Apparently, color responses in the eye arise from a combination of three separate photochemical processes, each associated with a different broad band of wave lengths. To convert wave-length data to numbers corresponding to visual impressions of color, use is made of available data on the response functions of the human eye. These are embodied in what is known as the CIE Standard Observer and Coordinate System for Colorimetry. The Standard Observer consists of tables giving the response of each of three assumed photochemical processes in the eye to light of each of the wave lengths of the visible spectrum. These response functions are designated $\bar{x}$, $\bar{y}$, and $\bar{z}$.

To convert spectrophotometric curves to numbers which correspond to perceived color, they are first multiplied wave length by wave length with the three CIE functions and totaled. The three totals which result from this integration are the tristimulus values of reflectance or transmittance. That is:

$$X = \Sigma \bar{x} E R \Delta \lambda$$
$$Y = \Sigma \bar{y} E R \Delta \lambda \quad (1)$$
$$Z = \Sigma \bar{z} E R \Delta \lambda$$

where R represents spectral reflectance and E the spectral distribution of the illuminant assumed to be falling on the specimen. This process of multiplying spectral curves by the tristimulus functions is tedious if performed manually. However, spectrophotometers are now available with a precise automatic integrator which perform the operations mechanically, but still relatively slowly. Most of the filter instruments used for color measurement make this integration automatically by using filters designed to combine with the photocells in the respective instruments so that the combinations have the spectral response characteristic of the standard observer. As a consequence, such reflectometers give tristimulus values directly.

However, until filter-photocell combinations are available which duplicate the response characteristics of the eye better than those in use today, filter-colorimeter measurements will be less accurate than those by spectrophotometry and tristimulus integration.

To compensate for this lack of spectral accuracy, the hitching post, or small-difference comparison method of measuring color has been developed. The hitching-post technique of color measurement is one which uses a large number of spectrophotometrically standardized "hitching-posts" to measure the colors of unknown specimen. For any unknown specimen, one standardizes his filter-type instrument on the hitching-post nearest in color to it. The present instrument is of this type. For small errors of color measurement, the standard used must be similar in both color and spectral curve to the specimen measured.

To convert tristimulus values of reflectance or transmittance to the visual dimensions of the color solid, the Y, or green-filter value is separated from the rest since it has the luminous dimension corresponding to the height above black. For the other two dimensions, which are designated by the general term chromaticity, the most common quantities are:

$$\bar{x} = \frac{X}{X+Y+Z}$$
$$\bar{y} = \frac{Y}{X+Y+Z} \quad (2)$$

From the values of $\bar{x}$ and $\bar{y}$, the dominant wave length ($\lambda$) and purity ($p$) are frequently derived. Dominant wave length is purely a psychophysical measure of color, being the wave length whose color added to white will produce a visual chromaticity match with the specimen being identified. The fraction of the spectral color in the matching mixture with white is the specimen's purity.

Unfortunately, because color scales are based on such matching mixtures of lights, they cannot be used in any simple way to adjust coloring ingredients in colored materials. Coloring ingredients, i.e., colorants, such as the oxides used in porcelain enamels and the stains used in glazes, impart color chiefly by absorbing or "subtracting" of some wave lengths than others. The color of a ceramic article is the result of "subtractive mixture" of the light-absorbing effects of the different coloring constituents used in it. Computation of the color of a mixture from values of the colors of its components is impossibly complicated. It is for this reason that the mixing of pigments, stains, and dyes is still largely an art.

Although unsuitable for formulation, measurements of color are widely used for color specifications, stability studies, and color tolerances.

It is a primary object of the invention to provide a precision photoelectric tristimulus instrument which will give direct values of color on uniform, visually meaningful scales having approximately the spacing of the Munsell color system with precision equal to, or better than the eye trained to detect commercial color differences.

Another object is to provide a compact, rugged, efficient instrument which is simple and not complicated in operation and can be used by unskilled operators with a minimum of training or instruction, yet will give accurate and reproducible results with great speed.

Another object is to provide a color difference instrument which is easy to read and convenient to operate, incorporating a rugged, yet accurate meter which is unaffected by mechanical vibration such as is often found in industrial surroundings where such instruments are used.

A further object is to provide a color instrument having a relatively few control knobs or wheels, closely spaced for easy reach, and so arranged that the direction of knob or wheel rotation always corresponds to the direction required to bring the balance-indicating device back to zero setting, which greatly facilitates both speed and ease of operation.

It is also an object of the invention to eliminate mechanical adjustment of photocells required in some previous instruments during the taking of readings, and to provide instead purely electrical circuit adjustments for all operations of the instrument. This permits removal of the sample-observing head from the reach of the operator, as in a monitoring device over a moving web.

Another object is to provide simple digital scales, with zero centered circuit components which eliminate the use of polarity switches when a change in sign of the reading occurs, and which have automatic register means for positively showing the sign of the reading without the possibility of error in reading the sign (or direction) of the value shown on the digital register.

Additional objects include the automatic temperature stabilization of all phototubes and filters for high stability and reproducibility of the results.

The specific nature of the invention, as well as other objects and advantages thereof, will clearly appear from a description of a preferred embodiment as shown in the accompanying drawings, in which:

FIG. 1 is a schematic diagram of a rectangular color solid;

FIG. 2 is a schematic circuit diagram showing the principle of the invention;

FIG. 6 is a side elevation of the apparatus shown in FIG. 1; and

Figure 3:
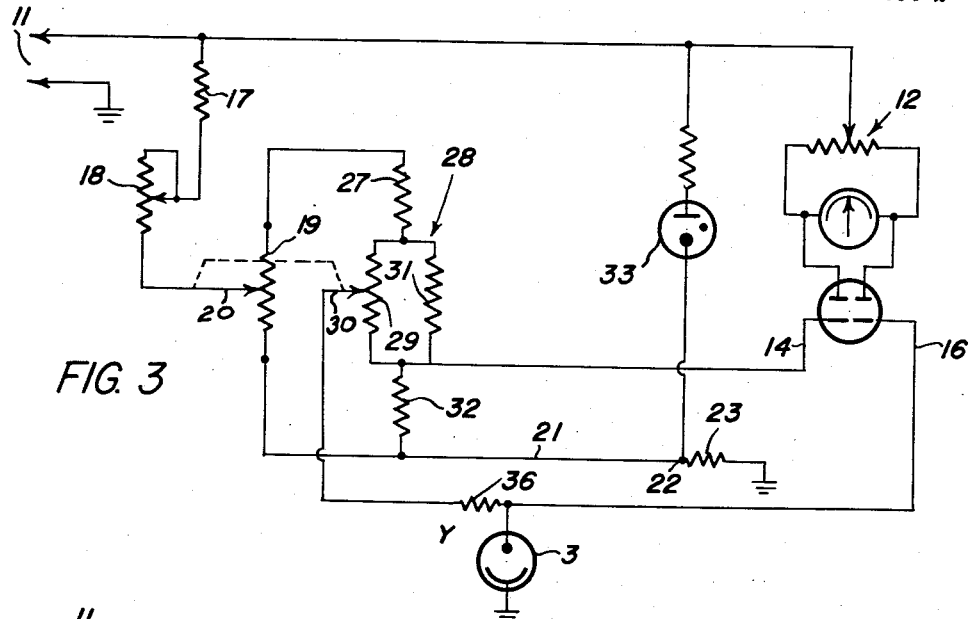
FIG. 3 is a simplified schematic circuit diagram showing the circuit of FIG. 2 with the selector switch in the L position.

In the conventional psychological color solid representing the colors of surfaces, the vertical axis represents the lightness, which varies from black to white through the various degrees of grayness; the hue is represented by the direction from the axis, the various directions corresponding to red, yellow, green, blue, purple, or intermediate colors; and the saturation is represented by the length of the radius extending from the gray or lightness axis to the periphery representing the strongest colors.

FIG. 1 shows another commonly used arrangement for depicting colors in terms of three values, generally corresponding to those of the conventional color solid, but conforming to a three-dimensional Cartesian coordinate system. An arbitrary scale of values is assigned to each coordinate as shown. The present instrument uses essentially the scales of FIG. 1.

In a practical instrument, it is desirable to have the units of the scale correspond to uniform steps of perceptual differences, and it is therefore necessary to provide, in effect, computing circuits which will translate the photocells' response to received light, after passing through the suitable color filters, into readings which correspond to such uniform steps. To achieve this, the three scales of FIG. 1 are related to tristimulus values of reflectance, G, A, B, obtained with green, amber, and blue filters respectively, by:

$$L = 100 G^{\frac{1}{2}}$$

$$a = 700 G^{\frac{1}{2}} \left( \frac{A-G}{A+2G+B} \right) \quad (3)$$

$$b = 280 G^{\frac{1}{2}} \left( \frac{G-B}{A+2G+B} \right)$$

where $L$, $a$, and $b$ are the coordinates shown in FIG. 1. The instrument is therefore arranged, as will be shown below, to provide three numbers corresponding respectively to these three values.

In 1942, Adams devised a rectangular surface-color solid in which the spacings of such colors are quite close to those of the Munsell Color System. His chromatic scales, now quite widely used, are customarily represented by:

$$a_A = 40(V_X - V_Y)$$

$$b_A = 16(V_Z - V_Y) \quad (4)$$

where the V's are the Munsell values-function equivalents of X, Y, Z. Because the value function introduces much the same change of scale intervals with reflectance as does $G^{\frac{1}{2}}$ in the Scofield equations above, the two sets of chromatic dimensions are similar.

However, between the Scofield and Adams solids, there is one significant spectral difference. The present source-filter-photocell combinations are designed to make G similar to Y, B similar to Z, and A similar to that part of the X distribution above 500 m$\mu$. As is well known, the CIE X distribution possesses a short wave component having a maximum at 442 m$\mu$ that is lacking in the A combination. Thus the Adams scales for chromaticity are spectrally similar to those used in the above equations except for the use of X with its double-humped spectral distribution instead of the single-humped A distribution. We use the Adams $X - Y$ difference for our $a$ scale because Hunter has shown it to give visually more uniform scales of color.

Referring to FIG. 2, the specimen 2, which is being measured, is illuminated with light from a suitable source 76, at an angle of 45° in the case of a reflecting specimen (as contrasted with a light transmitting specimen), through a suitable diffusing plate 15. A practical exposure unit uses a 6 volt instrument lamp and lenses and mirrors for projecting two beams from this lamp so as to strike the surface of the specimen from opposite directions at angles of 45° as will be shown below. Light reflected from the specimen in perpendicular and near perpendicular directions is measured by the photocells 3, 4 and 5, giving respectively the Y, X, and Z signals in Equation 1 above, by virtue of tristimulus light filters 7, 8, and 9 placed between the photocells and the light reaching them.

As shown by Richard S. Hunter in National Bureau of Standards Circular C429, it is not the colors of the filters alone that matter, but the combined response of each filter and its associated photocell or other light sensitive element. In the present case, S-4 photocells were used in a practical embodiment of the invention, and the spectral transmissions of the respective filters were therefore selected to give, together with these photocells, tristimulus color response functions similar to those of the normal human eye. The $\bar{x}$ filter, for the photocells used, consists of two parts: a larger part of reddish amber gelatine and a smaller part of blue glass. The $\bar{y}$ filter is composed essentially of two pieces of light yellow glass. The $\bar{z}$ filter is one piece of dark blue glass combined with an ultra-violet absorbing pale yellow glass. To more closely approximate the desired transmission curves than is sometimes possible in commercially obtainable filters, it is sometimes necessary to add additional pale trimming filters which lower the amplitude of selected portions of the light transmission characteristic curves of the filters.

The degree to which photocell 3 is stimulated by the reflected light from the specimen is used as an indication of the lightness factor L; similarly cell 4 is used to provide (in combination with cell 3) a signal which is a function of the red-green factor $a$; and cell 5 is used in the same manner for the yellow-blue factor $b$, referring to the chart of FIG. 1. Each cell, when stimulated, produces a voltage at its anode end, i.e., points X, Y, or Z, corresponding to its stimulation. However, the relationship between the voltages at X, Y, or Z, and the desired scale quantities, L, $a$, and $b$, is not a simple and direct one-for-one relationship, but involves these factors in a fairly complex manner, since each of these values affects the others. The different signals obtained from the circuits of FIG. 2 have to be adjusted for specimen luminance reflectance, or the chromatic measures of dark colors will be visually too small relative to those for light colors. The multiplying factor for this adjustment will be referred to as $f_Y$. The $f_Y$ multiplier in the instrument is actuated by the reflectance (or lightness) control which, therefore, must be set first. The mechanism used for $f_Y$ is to reduce with reduced luminous reflectance the reference against which the differences are measured.

The rectangular, uniform, surface-color scales achieved by the analog circuits of FIG. 2 are related to CIE illuminant C, X, Y, and Z, by the following equations:

Color difference meter from CIE
$$\begin{cases} L = Y^{1/2} \\ a = 175 Y^{-1/2}(1.02X - Y) \\ b = 70 Y^{-1/2}(Y - 0.847Z) \end{cases} \quad (5)$$

CIE from color difference meter
$$\begin{cases} Y = (0.01L)^2 \\ X = 0.9804\left(\dfrac{Y + 0.01aL}{175}\right) \\ Z = 1 - 181\left(\dfrac{Y - 0.01bL}{70}\right) \end{cases} \quad (6)$$

The multiplying constants in front of the equations for L, $a$, and $b$ are obtained by selection of resistances in the respective networks as shown in FIG. 3. The constants 1.02 and 0.847 which appear in front of X and Y respectively are for converting the illuminant C tristimulus values to reflectances. That is, if $X_C$ and $Z_C$ are the illuminant C reflectances for which $Mg = 1.0$, then:

$$X_C = 1.02X$$

$$Z_C = 0.847Z$$

Referring again to FIG. 2, the circuits used are energized by a constant voltage D.-C. supply 11, to which is connected a difference potentiometer 13 for zero setting of the instrument. The meter is fed signals from two signal lines 14 and 16 through a dual-triode 17, the grids of which are connected to the respective signal lines, while their plates are connected to their respective meter inputs, whereby the meter is initially adjusted by potentiometer 13 to zero scale position and thereafter measures the differences between the D.-C. voltage levels of the signals supplied to it by lines 14 and 16.

The ungrounded side of line 11 is also connected through a fixed resistor 17 and an adjustable resistor or potentiometer 18 to the slider of a reference potentiometer 19. One end of potentiometer 19 is connected through line 21 to point 22 and thence through a fixed resistor 23 to ground. The other end of potentiometer 19 is connected through the L setting of selector switch 24 to line 26 and thence through resistor 27 to a bridge arrangement 28 consisting of a potentiometer 29 and fixed resistor 31 connected in parallel as shown. All of the potentiometers shown in FIG. 2 are preferably 10-turn helical type, such as are made by the Helipot Corporation, and others; each requires 10 full turns of a control knob to move the slider from one end to the other, whereby a very fine adjustment can be secured. The values of the fixed resistors are given only by way of example, and are the actual values used in a practical embodiment of the invention; however, it will be understood that these values are only exemplary, and that the invention is not limited to the particular values employed.

The lower common end of bridge 28 is connected through resistor 32 to lead 21. A gas-tube regulator 33 is connected between point 22 and line 11 to aid in regulating and in maintaining essentially constant current through resistance 23 in the face of adjustments of potentiometer 18. This voltage regulation is necessary in order to hold phototube voltages and grid voltages in the tube 17 nearly constant. The slider 30 of potentiometer 29 is connected through selector switch 34, in the L position shown in FIG. 2, to a load resistor 36 connected to the anode of photocell 3. Line 14 of the difference meter is connected to the common point of resistors 29 and 32 via line 37 and switch 38 while line 16 of the meter is connected via switch 39 to point Y, which is at the anode potential of tube 3.

The elements above described are essentially all of the circuit elements involved in the L setting of switch 24, that is, the setting used in obtaining the value of L, which, as was indicated above, is one of the three values needed to identify a color. These elements are separated out from the rest of the circuit and redrawn in FIG. 3 in order to show more clearly the circuits used in obtaining the L value. The same reference characters are employed as in FIG. 2 to facilitate comparison of the two circuit drawings.

Referring to FIG. 3, it should be noted that this circuit is arranged as a substantially constant current circuit, so far as the effect of variation of the sliders of reference potentiometer 19 and Y balance potentiometer 29 are concerned. These two sliders are ganged; that is, they are fixed to move together so that they are both always at the same relative position on their respective resistance windings. However, due to the high series resistance of element 17 and the low resistance bridging elements 27 and 32, as well as the parallel bridging paths presented by the resistors 31 and 29, it will be apparent that as sliders 20 and 30 move along their respective resistance elements, the total current flow through slider 29 will remain substantially constant, since the net series resistance variation introduced by movement of the sliders in the bridging circuit shown is negligibly small. The circuit thus functions, in effect, as a constant current bridge, and for all practical purposes, the current through slider 20 may be considered as a constant current. The bridge is adjusted by varying the position of ganged sliders 20 and 30 until the difference meter reads zero, that is, the voltage drop across load resistor 36 of photocell 3 is balanced out. When this balance has been obtained, the scale setting is noted which corresponds to the distance from point zero of potentiometer 29 to the slider; this distance gives the value of $Y^{1/2}$, which corresponds to the desired reading for the value L as indicated in Equations 5. The reason for this will be apparent if it is considered first what the relative scale reading would be if both sliders moved all the way up to the position corresponding to the value 100 on the scale of potentiometer 29. In this condition, the voltage drop across potentiometer 29 is due to ½ of the current, I, flowing through slider 20, since the resistance values have been selected so as to cause this current division. The total drop across potentiometer 29 is therefore $\frac{1}{2} I \times R_{29}$. Considering, for example, the case where the ganged sliders 20 and 30 are moved half way down their respective scales or resistances, the current flow through potentiometer 29 is now ¼I, due to the lower resistance path from slider 20 through the lower portion of potentiometer 19, which diverts more of the current I to ground, while the upper portion of potentiometer 19 is now in series with line 26, so that the current flowing in line 26 is correspondingly reduced. At the same time, slider 30 has moved down to the halfway position so that it measures the drop across only half of $R_{29}$; this drop is therefore now equal to $\frac{1}{4}I \times \frac{1}{2}R_{29}$, which is only ¼ of the value of the drop at full scale, and the value of the measured output therefore corresponds to the square root of the linear change in setting. It will be readily seen that this square-root relationship holds for any other setting of the ganged sliders 20 and 30, and that therefore the measured output corresponds to the desired square-root relationship.

The value for L having been obtained, since this value is used in the subsequent measurements, the ganged slider 20, 30, is left at the setting obtained for value L, and the selector switch 24 is now moved to position $a$; this also moves switches 34, 39 and 38, which are ganged with switch 24 for common movement to the respective selective positions. The resulting circuit connections are drawn out in simplified form in FIG. 4. It will be seen that potentiometer 29 is effectively disconnected from the circuit, but reference potentiometer 19 is now connected to bridge circuit 42 through lead 25 and resistor 41. Circuit 42 comprises the center-tapped fixed resistor 44 in parallel with potentiometer 43 having a slider 46 connected to the load resistor 47 of photocell 4. Slider 46 is now adjusted to balance the drop in potentiometer 43 (which is being compared with the previously set output of reference potentiometer 19) against the output of photocell 3, which is supplied via lead 14 to the difference meter (not shown in FIG. 4). It will be seen that the scale setting of slider 46 corresponds to the output difference of the photocells 4 and 3 to give the relationship $X_C - Y$, and since the reference current obtained from reference potentiometer 19 via line 26 is the same as for the previous setting, this factor also enters into the setting, the circuit constants being such as to give a value on the scale corresponding to:

$$a = \frac{k}{Y^{\frac{1}{2}}}(1.02X - Y)$$

which corresponds in form to the required factors as set forth in Equations 5. The circuit values are adjusted so that the constants come out in the correct magnitude to give the desired scales of values.

Figure 4:
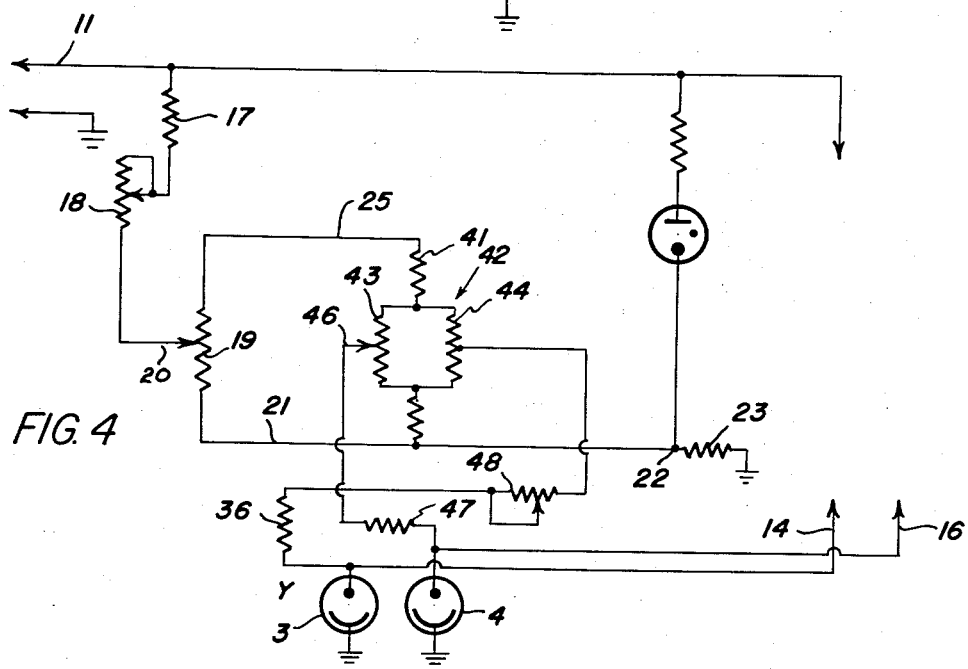
FIG. 4 is a simplified schematic circuit diagram of the circuit of FIG. 2 with the selector switch in the $a$ position.

When the selector switch 24 is moved to the remaining or $b$ position, the associated gang switches 34, 38 and 39 are also moved into their corresponding positions to establish a third circuit similar to that of FIG. 4, except that potentiometer 42 is now cut out and potentiometer 52 substituted, and the difference between the Y and Z outputs is obtained instead of between the X and Y outputs as before. The circuit connections can be readily traced, and involve no difference in principle from the preceding circuit. The circuit constants are selected so as to give a value corresponding to:

$$b = 70Y^{\frac{1}{2}}(Y - 0.847Z)$$

as required by Equations 5.

Associated with potentiometers 42 and 52 are standardizing potentiometers 49 and 59 respectively, and associated with the reference potentiometer 19 is the standardizing potentiometer 18 previously described. These potentiometers are used for initial standardizing, in which a standard specimen, as like as possible to the specimen being tested, and for which the correct values of L, $a$, and $b$ are known, is put into the machine, and the respective control knobs set in three operations as previously described to the known values of L, $a$, and $b$ for this standard specimen. At each step, if the machine is correctly calibrated, the difference meter should read zero. If it does not, the respective standardizing potentiometers are adjusted to make the meter needle read zero; this sets the "hitching post" calibration as previously described. The standard specimen is now removed and the specimen to be tested is substituted therefor. Switch 24 is thrown to the L setting to establish the circuit of FIG. 3, and ganged sliders 20, 30 adjusted until the meter again reads zero. The scale setting corresponding to this adjustment is now read to give the value of L for the specimen. Of course, if the unknown specimen happens to be exactly the same as the standard specimen, then the L value will be the same as before, but in the general case it will be different.

Switch 24 is now thrown to the $a$ setting, leaving slider 20 unchanged and the control knob for slider 46 is adjusted until the meter 12 again reads zero, to give the value of $a$, after which switch 24 is thrown to the $b$ position and the control knob for slider 56 is adjusted until the meter reads zero to give the value of $b$. The three values can now be read from the digital registers associated with the respective control knobs; these registers are designed (as will be shown below) so as to directly display numbers corresponding to the designated L, $a$, and $b$ values desired. These three numbers therefore identify the color without the exercise of any judgment or skill on the part of the operator other than to be able to identify the zero position of the meter indicator.

Figure 5:
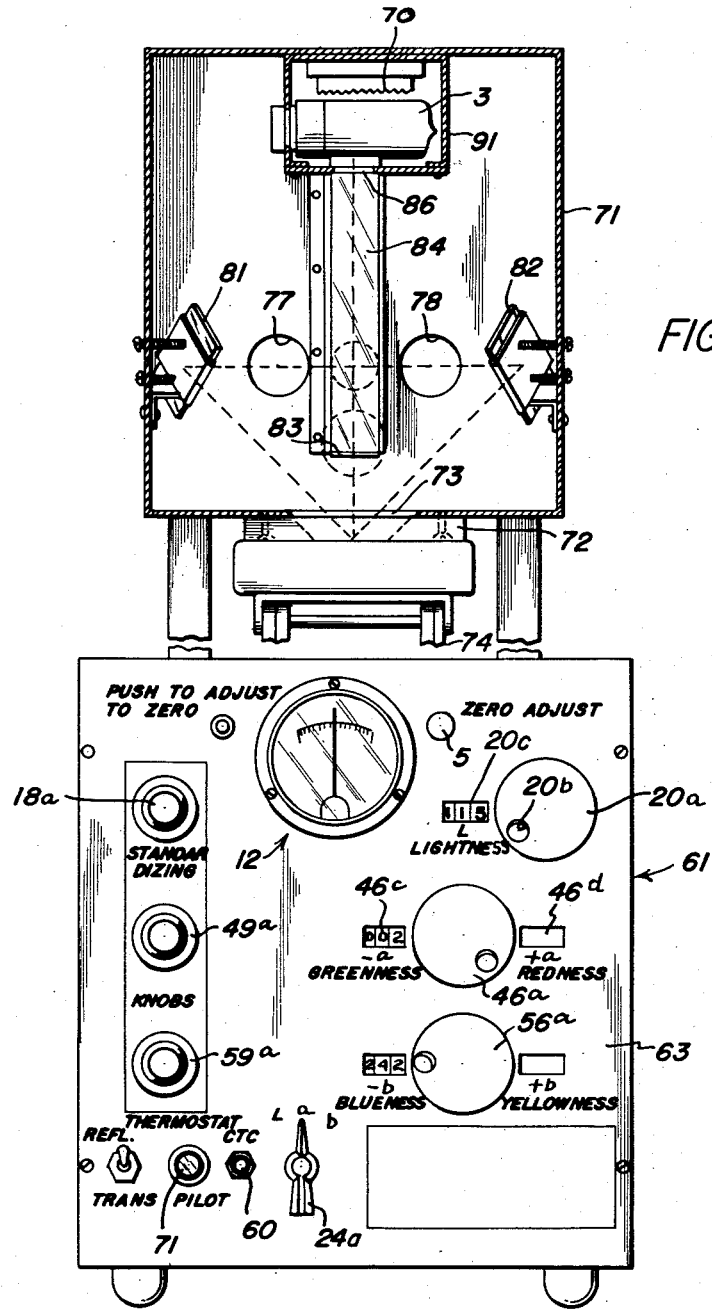
FIG. 5 is a front elevation, partly in section, of a colorimeter embodying the invention.

FIGS. 5 and 6 show a physical embodiment of a complete instrument according to the invention. Lower housing 61 contains a conventional power supply 62, which is not shown in the circuit drawings since it is conventional equipment and forms no part of the invention, and is used to supply the constant regulated D.-C. voltage 11 from any conventional 60-cycle A.-C. source and also supply the lower voltage required for the vacuum tube heaters, pilot lamps, etc. A control panel 63 carries meter 12, together with the various control knobs, which are identified by the same reference characters as are used to identify the corresponding potentiometers and switches in FIG. 2, with the subscript $a$ added; for example, knob 24$a$ is the control knob for switch 24, and also controls the associated gang switches 34, 38 and 39; similarly, knob 20$a$ identifies the control knob for slider 20, etc. Each of the potentiometer control knobs also contains a recessed portion 20$b$ near its circumference for the insertion of a finger, whereby the knob can be readily rotated. Alternatively, a projecting knob can be provided, to be grasped by two fingers. Associated with knob 20$a$ is a digital register 20$c$, for displaying a number corresponding to the rotational position and number of turns of the knob. Such digital registers for displaying in digital form a number corresponding to the rotational position of a rotatable control knob are well known, and per se forms no part of the present invention.

Associated with control knob 46$a$ are two registers 46$c$ and 46$d$ for indicating the redness and greenness respectively corresponding to the deviation of slider 46 from its center position. The greenness is indicated as a negative number and the redness as a positive number or value. In order to avoid any possible confusion on the part of the operator in reading these values, each register aperture on the panel is provided with a movable shutter or curtain mechanically arranged to cover the register whenever the associated slider has moved past the midpoint so that the value should be read on the other register.

Figure 7:
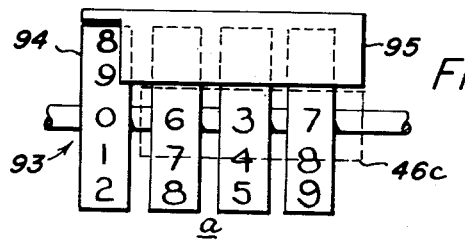
FIG. 7 is a schematic drawing showing the principle of the digit register shutters.

One mechanical arrangement for accomplishing this is shown in FIG. 7. This is accomplished simply by using a 4-decade register 93 in each case, although only three of the digits show through the aperture, as shown at 46$c$. The fourth digit register 94 is concealed behind the panel, as the aperture is not wide enough to show it; this register, like the others, is a wheel bearing the digits 0–9 inclusive. An arcuate shield or shutter 95 is suitably fastened to wheel 94 at the level of digit 9. It will be seen that as the register is rotated backward toward the zero setting for the three digits which are displayed through the aperture, the fourth digit wheel 94 remains in the zero position until the other three digit wheels reach the zero position, then the 9 digit of wheel 94 moves into alignment with the three displayed zeros, carrying the shutter 95 with it, which covers the aperture. The opposite register 46d is similarly but oppositely arranged, so its shutter has been covering it during the above-described operation, and it has been rotating in the opposite sense, so that at the same time one shutter descends, the other shutter rises as its fourth digit wheel moves from the 9 position to the zero position. Thus only the register which is to be read can be seen by the operator, obviating the possibility of error in reading the wrong register. It will be noted that the standardizing knobs 18a, 49a, and 59a are not provided with digital registers; this is because these standardizing knobs are used only to reset the major needle to zero, and therefore digital registers are not required. Supported above the casing 61 is the sensing unit 71 containing the optical elements of the apparatus. A specimen to be tested 72 is clamped against an aperture 73 at the bottom of casing 71 in any suitable manner, as for example by means of a jack 74, in light-fast position. Light from a lamp 76, which may suitably be a low-voltage instrument lamp, is directed through apertures 77 and 78 to mirrors 81 and 82 respectively, and thence directed an an angle of 45° to the surface of the specimen. Reflected light from the specimen normal to its surface strikes the bottom surface 83 of light-pipe 84, which is suitably a rectangular piece of clear methacrylate plastic. The bottom surface 83 is roughened to form a diffusing face to suitably distribute the light, which is then reflected internally until it reaches the opposite top surface 86 of the light pipe. Embedded in this surface or placed against it are three filters 7, 8 and 9 associated respectively with the photocells 3, 4 and 5 to provide the desired tristimulus characteristics for the light reaching the respective photocells as previously described. The three photocells are housed in a separate casing 91, preferably a heavy block of heat conducting and distributing metal, which is maintained at a uniform temperature by a thermostatically controlled heating element 70, also shown in FIG. 2. A pilot lamp 71, mounted on panel 63, may be employed to show positively the operation of the thermostatically controlled circuit for the heating element.

In order to facilitate manipulation and adjustment of the potentiometer control knobs, they are so oriented for rotation with respect to the meter needle, that rotation of any of the control knobs will cause the meter needle to move in the same rotational direction as the knob. Thus, if the needle is to the left of the zero position, the control knob which sets it should be rotated clockwise in order to bring the needle back to zero. This feature greatly facilitates the ease of manipulation of the instrument.

The color-temperature check merely provides for a reading on the standard white panel with the b (yellow-blueness) scale; the adjustable element 59 of the load resistor is shorted out for this purpose. If proper adjustment of light level is first made on the L scale in the usual manner, this reading of the b scale with load adjustment removed gives a relative measure of the yellowness or blueness of the light source.

It will be apparent that the embodiments shown are only exemplary and that various modifications can be made in construction and arrangement within the scope of the invention as defined in the appended claims.

We claim:

1. A color meter comprising a light source, a plurality of light-responsive photoelectric cells, a load resistor connected in series with each cell respectively, means for directing light from said source to a specimen to be measured and from said specimen toward said cells, light-diffusing means between said specimen and said cells, a plurality of separate filter means individual to said cells respectively and arranged to filter said diffused light reaching said cells in a plurality of spectral bands so selected as to produce electrical voltage responses across the load resistors of the respective cells corresponding to the spectral response functions of the human eye; electric circuit means for indicating and measuring the load resistor voltage response and the differences in voltage response of the respective cells arranged to produce an electrical output directly related respectively to the lightness L, the red-greenness a, and the yellow-blueness b, related to CIE illuminant C, X, Y, and Z by the following equations:

$$L = Y^{\frac{1}{2}}$$
$$a = 175Y^{-\frac{1}{2}}(1.02X - Y)$$
$$b = 70Y^{-\frac{1}{2}}(Y - 0.847Z)$$

separate scales for indicating the electrical values corresponding respectively to L, a and b, and two adjustable resistance means respectively in the a circuit and the b circuit for electrically standardizing the response of said photocells without mechanical adjustment.

2. In a color difference meter comprising a light source, a plurality of light-responsive photoelectric cells, means for directing light from said source to a specimen to be measured and from said specimen toward said cells, light diffusing means between said specimen and said cells, a plurality of separate filter means individual to said cells respectively and arranged to filter said diffused light reaching said cells in a plurality of spectral bands so selected as to produce an electrical voltage response corresponding to the spectral response functions of the human eye; the improvement comprising a high load resistance in series with each said cell, a voltage source, means for impressing a voltage from said voltage source across each cell through its series resistance, a null-balance measuring device having two inputs for comparing two load resistance voltages supplied to said inputs, electric circuit means for deriving a variable reference voltage from said voltage source, circuit network means for comparing the load resistor voltage, Y, of one of said cells with said reference voltage in accordance with a psychophysically significant function of the cell output, circuit means for applying said reference voltage and said cell voltage to the respective inputs of said meter, means for adjusting said reference voltage to balance the said function of said cell voltage value as indicated by zero reading of said meter, and means for measuring the amount of adjustment of said reference voltage.

3. The invention according to claim 2, said variable voltage means comprising an adjustable potentiometer connected across said constant voltage source.

4. The invention according to claim 3, said measuring means comprising slider means for said potentiometer, and digital indicating means for indicating the position of said slider means.

5. The invention according to claim 2, and additional means for further applying said adjusted reference voltage to an electric balancing network, means for applying said cell voltage, Y, and the voltage of another of said cells, X, to said network, means for adjusting said network to balance, said network being arranged to produce a setting upon balance which is directly related to the difference $kX - Y$ multiplied by $$\frac{p}{Y^{\frac{1}{2}}}$$

where p and k are constants determined by the network parameters, and means for connecting said network to said meter to indicate said balance.

6. The invention according to claim 5, said network adjusting means comprising a center-tapped potentiometer bridge means having slider means for adjusting its value.

7. The invention according to claim 6, and digital indicating means for indicating the position of said last slider means.

8. The invention according to claim 7, said digital indicating means comprising two digital indicators respectively for indicating values on each side of the center-position of said potentiometer bridge means, shutter means for said digital indicator means arranged to expose one indicator when the slider is on that side of center which said indicator displays and to cover said indicator when the slider is on the other side of the center position.

9. The invention according to claim 7, and rotary manually operable means for moving said slider and directionally arranged to zero the meter upon rotation of said manually operable means in the same direction as the meter indicator moves upon rotation of said manually operable means.

10. The invention according to claim 2, a casing enclosing all of said photoelectric cells, and thermostatically controlled heater means in said casing for maintaining all of said cells at the same uniform temperature.

References Cited in the file of this patent
UNITED STATES PATENTS

| | | |
|---|---|---|
| 2,574,264 | Hunter | Nov. 6, 1951 |
| 2,774,276 | Glasser et al. | Dec. 18, 1956 |
| 2,869,415 | Kaye | Jan. 20, 1959 |
| 2,910,909 | Stone et al. | Nov. 3, 1959 |